United States Patent [19]

Hashimoto et al.

[11] Patent Number: 5,255,308
[45] Date of Patent: Oct. 19, 1993

[54] WIDE AREA CORDLESS TELEPHONE SYSTEM CAPABLE OF RECEIVING INCOMING GROUP ADDRESS CALLS

[75] Inventors: Tadao Hashimoto, Tokyo; Kazushige Tanaka, Kanagawa, both of Japan

[73] Assignees: NEC Corporation; Nippon Telegraph and Telephone Corp., both of Tokyo, Japan

[21] Appl. No.: 652,724

[22] Filed: Feb. 8, 1991

[30] Foreign Application Priority Data

Feb. 8, 1990 [JP] Japan .................................. 2-30104

[51] Int. Cl.$^5$ .......................................... H04M 11/00
[52] U.S. Cl. ...................................... 379/61; 379/57; 379/58; 379/62; 379/63
[58] Field of Search ...................... 379/57, 58, 61, 62, 379/63

[56] References Cited

U.S. PATENT DOCUMENTS

| | | | |
|---|---|---|---|
| 4,833,702 | 5/1989 | Shitara et al. | 379/62 |
| 4,852,148 | 7/1989 | Shibata et al. | 379/61 |
| 4,864,599 | 9/1989 | Saegusa et al. | 379/62 |
| 4,879,740 | 11/1989 | Nagashima et al. | 379/60 |
| 4,939,785 | 7/1990 | Murata et al. | 379/61 |
| 4,991,198 | 2/1991 | Tate et al. | 379/61 |
| 4,998,271 | 3/1991 | Tortola et al. | 379/61 |

FOREIGN PATENT DOCUMENTS 0213929 3/1987 European Pat. Off. .

*Primary Examiner*—Curtis Kuntz
*Assistant Examiner*—Vijay Shankar
*Attorney, Agent, or Firm*—Sughrue, Mion, Zinn, Macpeak & Seas

[57] ABSTRACT

In a wide area cordless telephone system, an individual-call signal is generated if an incoming call from the telephone network is an individual call to one of cordless stations of a group and a group-call signal is generated if it is directed to all cordless stations of the group. A group of access units are associated with the cordless station of each group to establish a control channel and speech channels with the cordless stations. The access units respond to the individual-call signal by transmitting a speech channel identifier to one of the cordless stations through the control channel and transmitting a ringing signal through a speech channel specified by the speech-channel identifier. In response to the group-call signal, speech-channel identifiers are successively transmitted from the access units to the cordless stations through the control channel and group ringing signals are respectively sent to the cordless stations through speech channels specified by the speech-channel identifiers. In a modified embodiment, the cordless stations receive pairing identifiers each containing a pair of an access unit identifier and a cordless station identifier and transmit a response containing one pairing identifier that specifies the own station. The access units also receive pairing identifiers from the controller for detecting a match with those received from the cordless stations. If a match is detected by each access unit, it is entitled to send a speech-channel identifier to the cordless station which is specified by the matched identifiers.

8 Claims, 9 Drawing Sheets

RADIO CONTROL UNIT

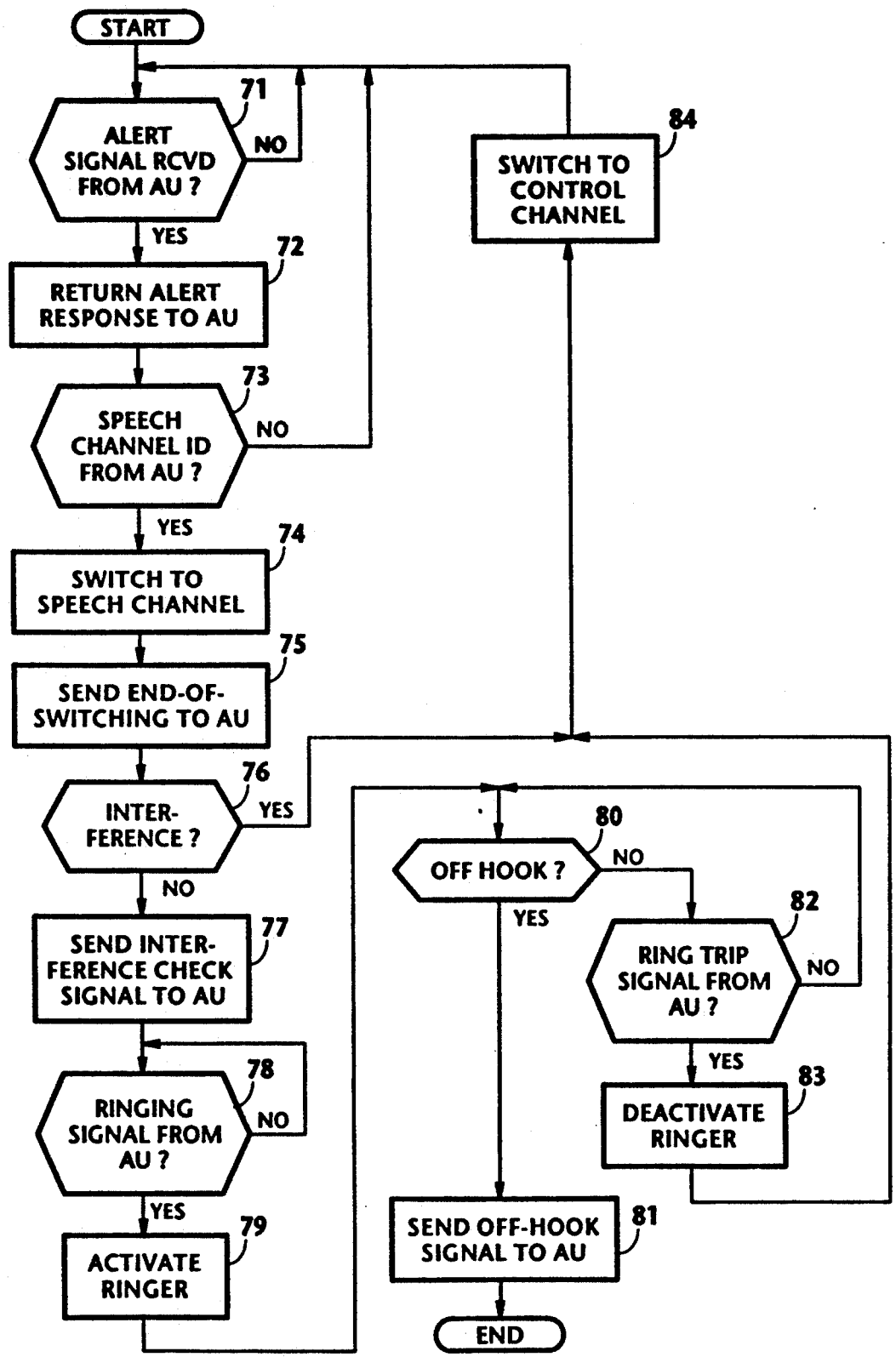

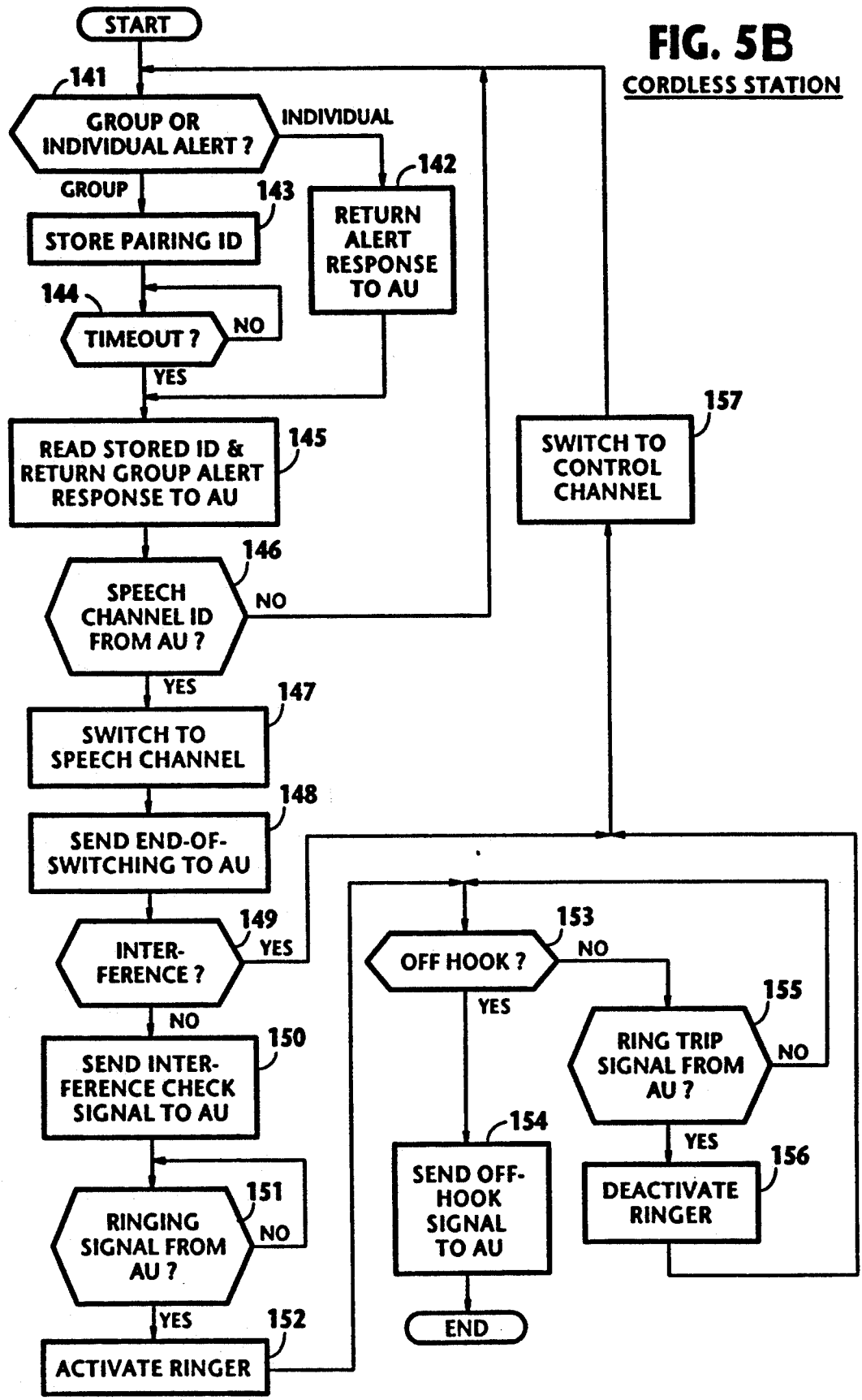

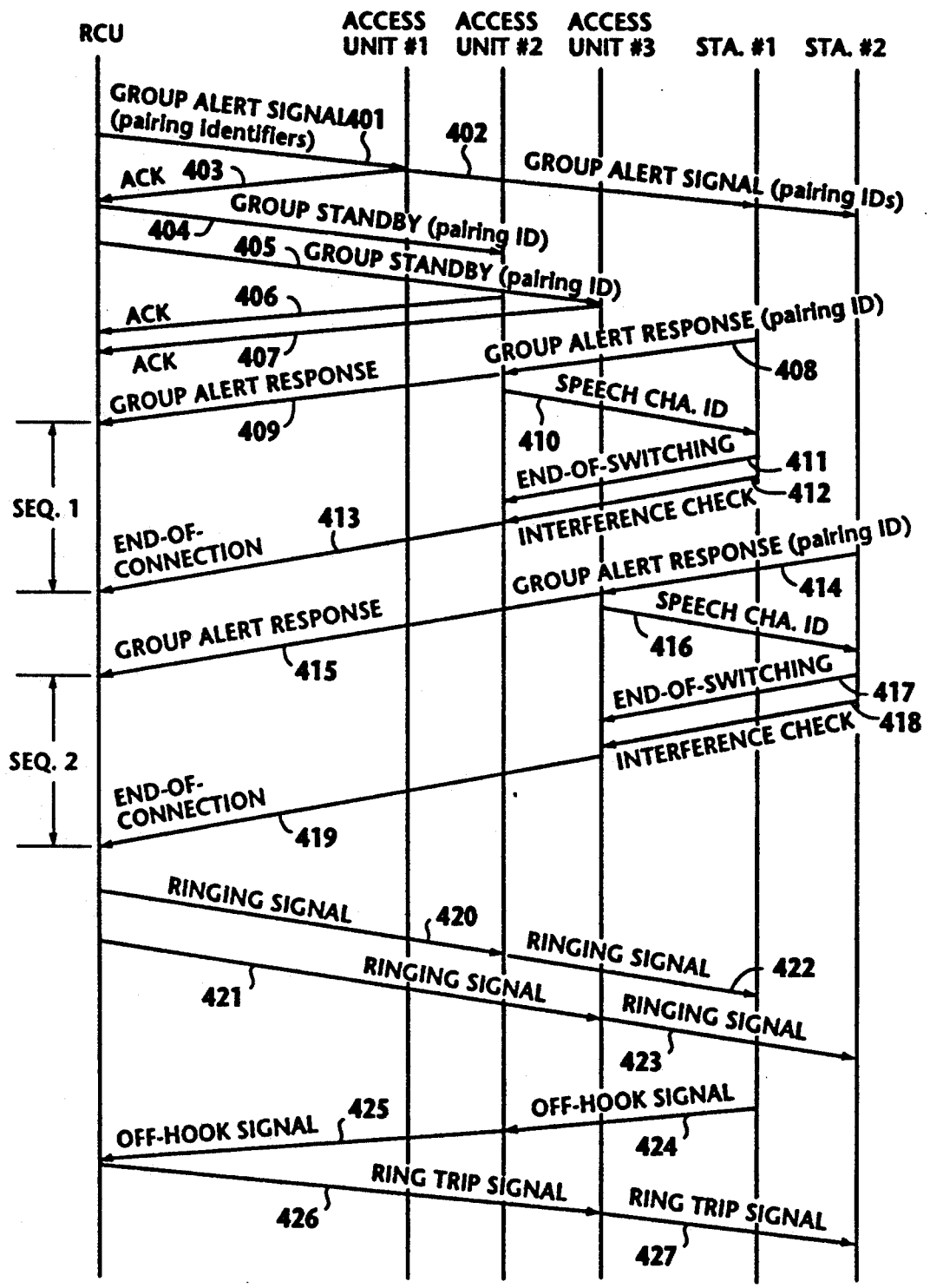

WIDE AREA CORDLESS TELEPHONE SYSTEM CAPABLE OF RECEIVING INCOMING GROUP ADDRESS CALLS

BACKGROUND OF THE INVENTION

The present invention relates generally to cordless telephone systems connected to a public or private switched telephone network, and more specifically to the reception of incoming calls from the telephone network to the wide area cordless telephone system.

The current wide area cordless telephone system for business applications serves divided business areas. It includes a radio control unit connected to a public or private switched telephone network and access units which are divided into groups corresponding to the business areas. The access units in each area are located at strategic points for establishing radio channels with cordless stations located in the same area as the access units. The radio control unit monitors the location of each cordless stations through the access units by storing the locations of the cordless stations and constantly updating the stored records in order to respond quickly to an originating call to or an incoming call, from the network.

With the current system, cordless stations are uniquely assigned address numbers. All incoming calls from the network are treated as an individual call directed only to one of the cordless stations which is addressed. Therefore, the absence of the addressed user may cause a delay in answering the call, and hence, a need arises to allow all incoming calls to be answered by any of the users of each business area.

SUMMARY OF THE INVENTION

It is therefore an object of the present invention to provide a wide area cordless telephone system which enables incoming calls to be answered by any users.

Another object of this invention is to provide a wide area cordless telephone system capable of selectively responding to individual calls and group calls.

According to a first aspect of the present invention, there is provided a wide area cordless telephone system which covers a plurality of service areas in each of which a group of cordless stations are located. The system comprises a controller connected to a telephone network for generating a group-call signal when an incoming call from the telephone network is directed to all cordless stations located in a common service area. A plurality of access units are divided into groups corresponding to the service areas. The access units located in each service area establishes a radio control channel and a plurality of radio speech channels with the cordless stations of the same group as the access units, and are responsive to the group-call signal from the controller for successively transmitting speech-channel identifiers to the cordless stations through the control channel and transmitting ringing signals respectively to the cordless stations through the speech channels which are specified by the successively transmitted speech-channel identifiers.

According to a second aspect of the present invention, the controller generates an alert signal containing a plurality of pairing identifiers when receiving an incoming call from the telephone network which is directed to all cordless stations of the same group, and successively generates standby signals each containing a different one of the pairing identifiers. A specified one of the access units is responsive to the alert signal from the controller for transmitting a copy of it to each of the cordless stations through the control channel and causing the cordless stations to successively return respective ones of the pairing identifiers through the control channel. The access units are respectively responsive to the standby signals from the controller for respectively storing a pairing identifier contained in a respective one of the standby signals. Each of the access units is responsive to one of the pairing identifiers from the cordless stations if it matches the stored pairing identifier for transmitting a speech-channel identifier to the cordless station which is specified by the stored pairing identifier through the control channel. A ringing signal is sent to the specified cordless station through a speech channel specified by the transmitted speech-channel identifier.

Preferably, the controller further generates an individual-call signal if an incoming call from the network is an individual call directed to one of the cordless stations. The access units are further responsive to the individual-call signal for transmitting a speech-channel identifier to one of the cordless stations through the control channel and transmitting a ringing signal through a specified speech channel.

BRIEF DESCRIPTION OF THE DRAWINGS

The present invention will be described in further detail with reference to the accompanying drawings, in which:

FIGS. 2A, 2B and 2C are flowcharts illustrating programmed sequences of instructions performed respectively by the radio control unit, access unit and cordless station according to a first embodiment of the present invention;

FIGS. 5A, 5B are flowcharts illustrating programmed sequences of instructions performed respectively by the radio control unit, access unit and cordless station according to the second embodiment of the present invention; and FIG. 6 is a view illustrating the overall operation of the second embodiment when an incoming signal from the PBX is a group call.

DETAILED DESCRIPTION

Figure 1:
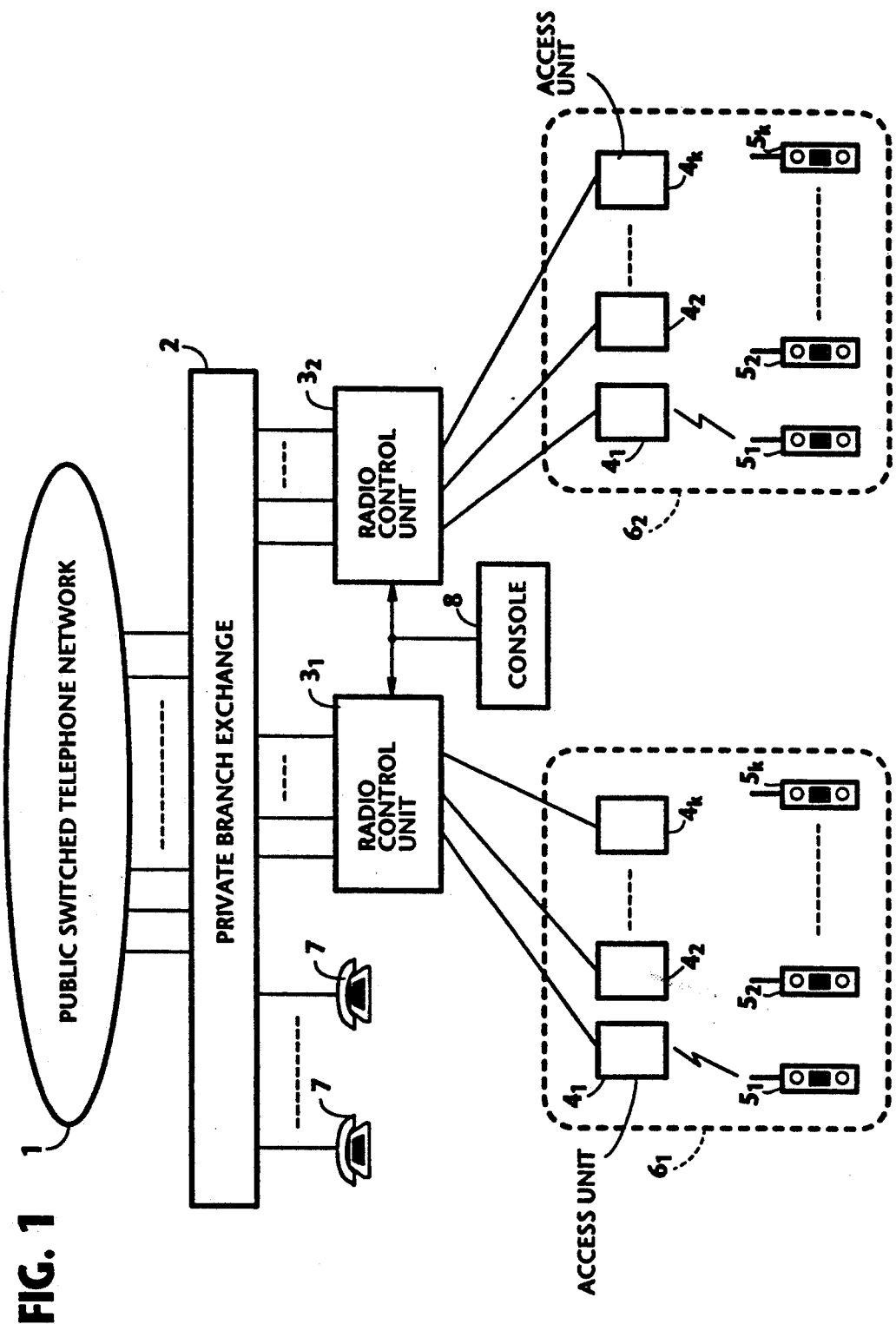
FIG. 1 is a block diagram of a wide area cordless telephone system embodying the present invention.

Referring now to FIG. 1, there is shown a wide area cordless telephone system embodying the present invention. The whole area of the system is divided into service areas 6. Only two service areas $6_1$ and $6_2$ are shown for purposes of simplicity. Corresponding to service areas, the whole system is divided into subsystems, each comprising a radio control unit 3, access units 4 and cordless stations 5. In the illustrated embodiment, radio control units $3_1$ and $3_2$ are respectively associated with service areas $6_1$ and $6_2$ and connected to line terminals of a private branch exchange 2 to which ordinary telephones 7 may also be connected. The PBX is in turn connected through exchange lines to the public switched telephone network 1. Calls between stations belonging to different service areas are made via the PBX.

Cordless stations 5 are divided into groups corresponding to service areas $6_1$ and $6_2$. Access units 4 are likewise divided into groups corresponding to service areas 6, the access units of each group being located at strategic points of the own service area. For convenience of system description, each service area has as many cordless stations $5_1 \sim 5_k$ as there are access units $4_1 \sim 4_k$. Access units 4 are connected to the corresponding radio control unit 3 to establish two-way radio channels to cordless stations $5_1$ through $5_k$ which belong to the same service area. Incoming calls from the PBX are made on a per individual (or per station) basis or on a per group (or per area) basis. The term "group" in this specification refers to the cordless stations belonging to each service area. In response to a group-based incoming call (or simply, a group call), ringing signals are transmitted to all cordless stations of each service area to alert the users of the same group. Whereas, in response to an individual call, only one uniquely addressed cordless station is alerted in a manner known in the art.

A service console unit 8 is connected to radio control units 3 for setting various system parameters to configure a wide-area cordless telephone system that is particularly tailored to the needs of the users.

Each subsystem has a full-duplex control channel and several full-duplex speech channels. The control channel is used for exchanging control signals during call setup periods before connections are established on a speech channel. In a well known manner, each of the access units and cordless stations is provided with a radio transceiver and frequency synthesizers for establishing a connection between them in response to a channel switching signal using a microprocessor-based controller. Similarly, each radio control unit includes a microprocessor-based controller for providing overall subsystem control.

The signal exchanged between each radio control unit and each access unit and the signal exchanged between each access unit and each cordless station are transmitted as a 214-bit packet containing a preamble, a frame sync, a group identifier, check bits, a control field and a data field. The control field indicates the type of call (individual or group) and a channel identifier. The data field contains a called station address number, a group address number, a channel identifier, and a pairing identifier which will be used in the second embodiment of this invention for pairing an access unit and a cordless station during an incoming group call.

Figure 2A:
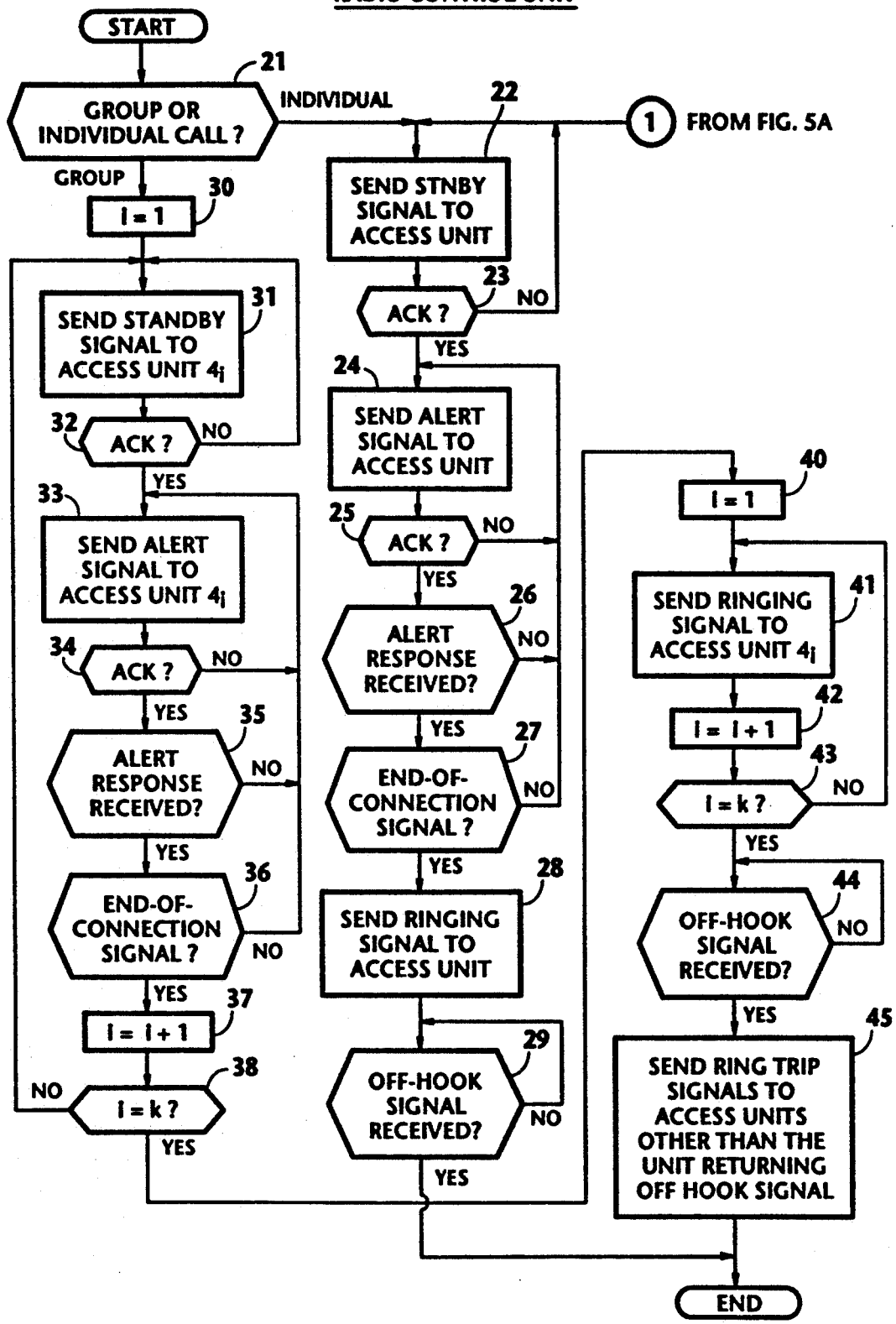
Figure 2B:
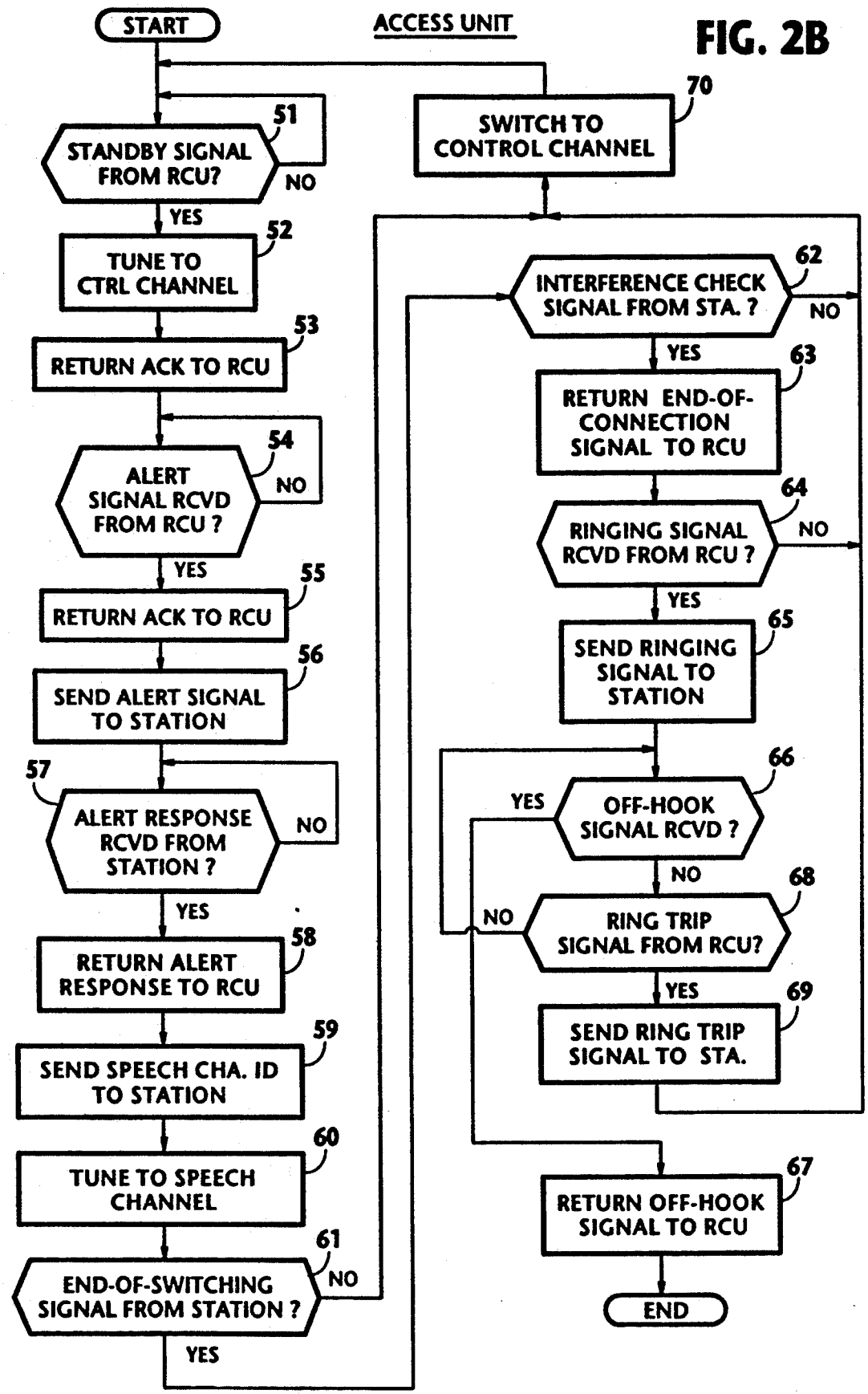

In FIGS. 2A, 2B and 2C, routines of programmed instructions are illustrated for processing an incoming individual call and an incoming group call from the PBX according to a first embodiment of the present invention, with FIGS. 2A, 2B and 2C corresponding to the instructions performed by the microprocessor-based controllers of radio control unit 3, access unit 4 and cordless station 5, respectively.

In FIG. 2A, the program execution of each ratio control unit starts with decision step 21 which determines whether the incoming call is an individual or group call. If decision is made in favor of an individual call, exit is to operations step 22 which directs the sending of a standby signal which is a command signal for tuning a received access unit or cordless station to the control channel. This standby signal is sent to one of the associated access units to cause it to switch to the specified control channel for readying to receive a forthcoming alert signal. Exit then is to decision step 23 which checks to see if an acknowledgment signal is returned from the access unit. If there is none, control repeats step 22 to retransmit the standby signal. If the answer is affirmative in step 23, operations step 24 is executed by sending an alert signal to that access unit, containing the address, or identifier of the called station. If an acknowledgment is received from the access unit (step 25) in response to this alert signal, control moves to step 26 to determine if an "alert response" signal is returned from the access unit, indicating that the alert signal has been relayed through the access unit and received by the called station to invoke a series of preliminary actions necessary for it to accept the call. Control then goes to step 27 to check to see if an "end-of-connection" signal is returned from the access unit, indicating that the called station is ready to accept the incoming call. If it is, control advances to step 28 to send a ringing signal to the access unit to alert the user. If a negative decision is made in each of steps 25, 26 and 27, control returns to step 24 to retransmit the alert signal. When the called station goes off hook, an off-hook signal is transmitted from the called station and relayed by the access unit to the radio control unit. Decision step 29 is provided to check to see if the off-hook signal is received from the access unit. If the answer is affirmative, control moves to the end of the incoming call processing routine and enters a talking routine, not shown.

If the incoming call is a group call, step 30 is executed by setting a variable i to one. Exit then is to step 31 which directs the sending of a standby signal to access unit $4_i$ to cause it to switch its transceiver to the radio control channel of the subsystem in order to make it quickly respond to a signal from the RCU and send a copy of it to cordless stations. If an acknowledgment signal is returned fro access unit $4_i$ (step 32), control advances to step 33 which directs the sending of an alert signal to access unit $4_i$, containing the address of one of the cordless stations of the called group. If an acknowledgment signal is returned from access unit $4_i$ (step 34), control proceeds to step 35 to check to see if an alert response signal is received. This signal corresponds to the alert response of step 26. As will be understood as the description proceeds, the addressed cordless station responds to the alert signal and returns an alert response containing in it the address of the own station and invokes a series of preliminary actions to receive the call. If the answer is affirmative in step 35, end-of-connection check is made (step 36). If the connection is established, control moves to step 37 to increment variable i by one and proceeds to step 38 to check to see if i=k. If the answer is negative, control returns to step 31 to repeat the process so that the next cordless station is alerted and a connection is established to it. By repeating the process until i=k, all cordless stations of the called group are alerted and connections established.

Control now exits the loop and enters step 40 to reset variable i to one to initiate a ringing sequence. A ringing signal is sent to access unit $4_i$ (step 41), and variable i is incremented by one (step 42) and checked against the value k (step 43) to see if there is a match or mismatch therebetween. If i is smaller than k, steps 41 and 42 are repeated so that ringing signals are successively sent to access units $4_i$ through $4_k$ and the users of all stations of the called group are alerted in rapid succession. If one of the users answers the group call, an off-hook signal is sent from that user station, containing in it the address of the station, and relayed through the associated access unit and received by the radio control unit (step 44). Exit then is to step 45 which directs the sending of ring trip signals to all access units other than the unit from which the off-hook signal has been received.

In FIG. 2B, the program execution of each access unit begins with decision step 51 which checks to see if a standby signal is received from the associated radio control unit. If it is, control exits to step 52 to tune its transceiver to the control channel and returns an acknowledgement signal to the RCU (step 53). Exit then is to step 54 which checks to see if an alert signal is received from the RCU. If the answer is affirmative, control exits to step 55 to return an acknowledgement signal to the RCU and goes to step 56 to send an alert signal to the associated cordless station. Exit then is to step 57 to check to see if there is an alert response from the cordless station. If there is one, control moves to step 58 to return an alert response to the RCU and sends a speech channel identifier to the cordless station (step 59). Control proceeds to step 60 to tune to a speech channel specified by the channel identifier, and goes to step 61 to determine if there is an end-of switching signal from the cordless station signifying that it has switched to the specified speech channel. If the answer is negative, control exits to step 70 to switch the transceiver of the access unit to the control channel, and control returns to step 51. If the answer is affirmative, control exits to step 62 to check to see if an interference check signal is received from the associated cordless station indicating that no interference occurs on the specified speech channel. If the answer is negative, control exits to step 70, and if affirmative, it moves to step 63 to return an end-of-connection signal to the RCU indicating that a call attempt to that cordless station is successful. On receiving this end-of-connection signal, the radio control unit sends a ringing signal to the access unit which checks it (step 64) and regenerates it (step 65) for transmission to the associated cordless station. If an off-hook signal is received from the cordless station (step 66), the access unit returns an off-hook signal to the RCU (step 67). If no off-hook signal is received, control moves to step 68 to check for the presence of a ring trip signal from the RCU. If there is one, a ring trip signal is regenerated by the access unit and transmitted to the cordless station (step 69).

In FIG. 2C, the program execution of each cordless station begins with decision step 71 which checks to see if there is an alert signal from the associated access unit. If there is one, control moves to step 72 to return an alert response to the RCU. Exit then is to step 73 to check for the presence of a speech channel identifier from the access unit. If there is one, control exits to step 74 to tune its transceiver to a speech channel specified by the channel identifier. An end-of-switching signal is sent to the access unit (step 75) and interference is checked (step 76). If no interfering signal is present on the speech channel, the cordless station transmits an interference check signal to the access unit (step 77). If interference exists, control advances to step 84 to switch its transceiver to the control channel and returns to step 71. Following the transmission of the interference check signal, the cordless station waits for the reception of a ringing signal (step 78) and activates its ringer (step 79) in response to it. If the cordless station goes off (step 80), an off-hook signal is sent to the access unit (step 81), containing in it the station address. If the ringing signal goes unnoticed by the station, control exits to step 82 to check for the presence of a ring trip signal. If the answer is negative, control returns to step 80, and if the answer is affirmative, control proceeds to step 83 to deactivate the ringer and exits to step 84 to switch the station transceiver to the control channel.

Figure 3:
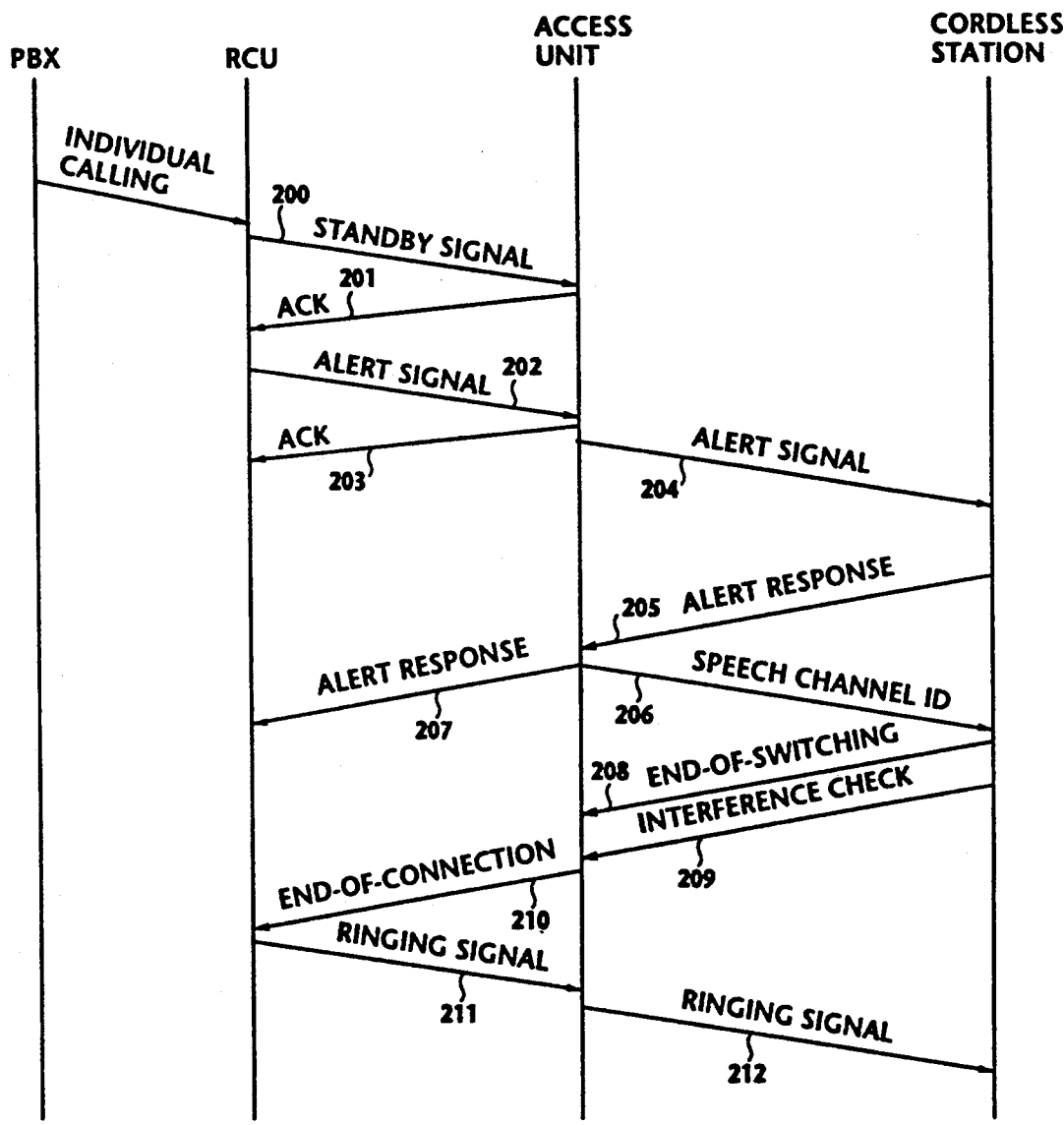
FIG. 3 is a view illustrating the overall operation of the first embodiment as well as a second embodiment when an incoming signal from the PBX is an individual call.
Figure 4:
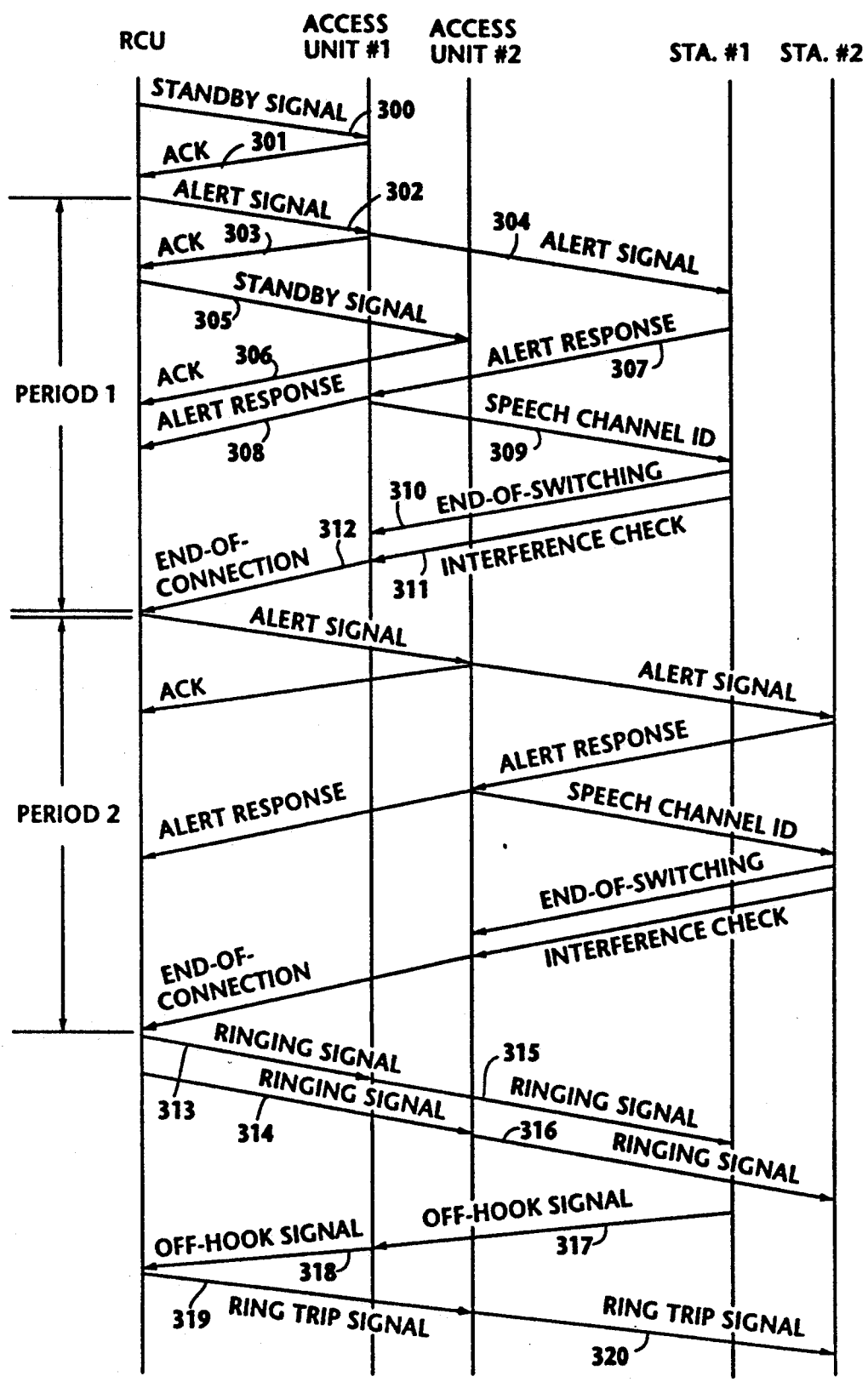
FIG. 4 is a view illustrating the overall operation of the first embodiment when the incoming signal from the PBX is a group call.

The overall operation of the first embodiment of the present invention will be fully understood with reference to FIGS. 3 and 4 in which operational sequences for individual and group calls are respectively illustrated.

If an incoming call received by a radio control unit from the PBX is an individual call (FIG. 3), a standby signal 200 is transmitted from the RCU to an access unit which returns an acknowledgment signal 201 to the RCU. The latter then sends an alert signal 202 to the access unit which returns an acknowledgment 203 and sends an alert signal 204 to a called station, containing in it the address of the called station. The called station recognizes that an incoming call is forthcoming and returns an alert response 205 to the access unit, containing in it the own address number. The access unit returns an alert signal 207 to the RCU and sends back a speech channel identifier 206 to the called station to cause it to switch to a specified speech channel. When this switching is complete, the called station sends an end-of-switching signal 208 to the access unit and provides an interference check. If no interference occurs, it sends an interference check signal 209 to the access unit, which responds to it by returning an end-of-connection signal 210 to the RCU. A ringing signal 211 is then transmitted from the RCU to the access unit which relays it as a signal 212 to the called station.

If the incoming call from the PBX is a group call (FIG. 4), a standby signal 300 is sent from the RCU to an access unit #1, which returns an acknowledgment signal 301 to it and switches its transceiver to the control channel. The RCU then sends an alert signal 302 to access unit #1, which sends a copy 304 of the alert signal to a cordless station #1. Following the reception of acknowledgment signal 303, the RCU sends a standby signal to access unit #2, which tunes its transceiver to the control channel and returns an acknowledgment signal 306 to the RCU. On the other hand, cordless station #1 returns an alert response 307 to access unit #1, containing in it the address number of station #1. A copy 308 of the alert signal is returned from access unit #1 to the RCU, and a speech channel identifier 309 is sent to station #1. Station #1 switches its transceiver from the control channel to a speech channel specified by the channel identifier and returns an end-of-switching signal 310 to access unit #1, followed by an interference check signal 311 if no interference is detected on the speech channel. Access unit #1 responds to interference check signal 311 by returning an end-of-connection signal 312 to the RCU.

The transmission of alert signal 302 marks the beginning of a sequence 1 for the exchanging of signals between access unit #1 and station #1 and the reception of end-of-connection signal 312 marks the end of the sequence 1. Similar events occur during a sequence 2 for the exchanging of signals between access unit #2 and cordless station #2 except for the transmission of a standby signal to another access unit if access unit #2 is the last one. Thus, similar sequences are repeated as many times as there are access units, so that the ringers of all cordless stations of the called group are activated to alert all users of the called group.

At the end of sequence 2, ringing signals 313 and 314 are successively sent from the RCU to access units #1 and #2, respectively, and relayed as copies 315 and 316 of the ringing signals to stations #1 and #2, respectively. If station #1 goes off hook, it sends an off-hook signal 317 to access unit #1 and a copy 318 of this signal is returned from access unit #1 to the RCU. In response to the off-hook signal 318, the RCU sends a ring trip signal 319 to access unit #2, which relays a copy 320 of the ring trip signal 319 to station #2 to deactivate its ringer. It is seen that such ring trip signals will be sent to other cordless stations if more than two cordless stations are provided.

Figure 5A:
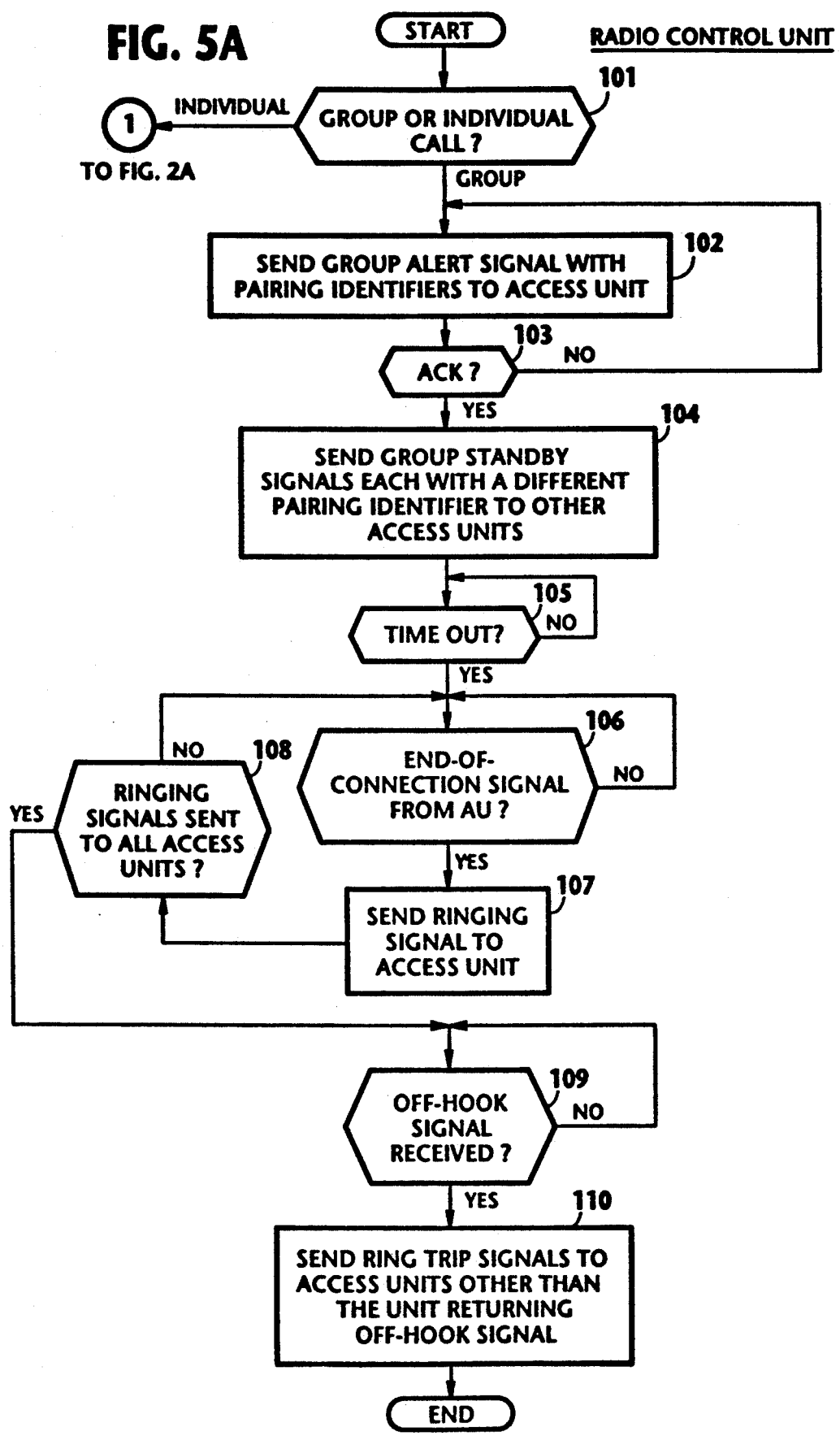

A second embodiment of the present invention is shown in FIGS. 5A, 5B and 5C.

In FIG. 5A, the program execution of each radio control unit starts with decision step 101 which determines whether the incoming call is an individual or group call. If an individual call is received, exit is to operations step 22 of FIG. 2A to perform instructions shown therein in a manner as described above. If a group call is received, control exits to step 102 to send a group alert signal to one of the access units. This group alert signal contains a plurality of pairing identifiers indicating access units and cordless stations which establish a channel therebetween when responding to an incoming group call. As will be described, the access unit receiving the group alert signal from the RCU sends a copy of this signal to all cordless stations of the called group. Exit then is to decision step to check for the presence of an acknowledgment signal from that access unit. If the answer is affirmative, control goes to step 104 to successively send group standby signals to all access units other than one to which the group standby signal has been sent. Each of these group standby signals contains a different pairing identifier. Following a timeout period (step 105) in which the RCU checks for the presence of acknowledgment signals from all the receiving access units, control proceeds to step 106 to check for the presence of an end-of-connection signal from one of the access units. If there is one, a ringing signal is sent to that access unit (step 107). Control proceeds to step 108 to check to see if the ringing signal is sent to all access units to which the group standby signals have been transmitted. If the answer is negative, control repeats the execution of steps 106 and 107, and if the answer is affirmative, it proceeds to step 109 to check for the presence of an off-hook signal. If there is one, control advances to operations step 110 which directs the sending of ring trip signals to the access units other than the one from which the off-hook signal has been received.

In FIG. 5B, the program execution of each access unit starts with decision step 111 which determines which signal the access unit has received. If the signal is indicative of individual cal, control moves to step 112 to return an acknowledgment signal to the RCU. An alert signal containing a called station address is sent to the stations (step 113). If an alert response is not received within a specified timeout period (step 114), control returns to step 111 to repeat the process.

If the signal received from the RCU is a group alert signal, control exits to step 128 to return an acknowledgment signal to the RCU and moves to step 129 to send a group alert signal containing a different pairing identifier to each cordless station of the called group, and returns to step 111.

If the signal received from the RCU is a group standby signal, exit then is to step 130 to return an acknowledgment signal and proceeds to step 131 to store the pairing identifier contained in the received group standby signal. Exit then is to step 132 to check for the presence of a group alert response signal from a cordless station, containing a pairing identifier. If there is one, exit is to step 133 in which the pairing identifier received from the cordless station is compared with the pairing identifier received from the RCU to detect a match or mismatch therebetween. If a mismatch is detected, control returns to step 132 to repeat the process.

If the answer is affirmative in step 114 or a match is detected in step 133, exit then is to step 115 to send a speech channel identifier to the access unit that has returned the individual or group alert signal, followed by step 116 to tune to a speech channel specified by the channel identifier. An alert response signal is then sent to the RCU (step 117) and the presence of an end-of-switching signal from the cordless station is checked (step 118). If there is one, control proceeds to step 119 to check for the presence of an interference check signal from the station. If there is one, control goes to step 120 to return an end-of-connection signal to the RCU. Control then checks for the presence of a ringing signal from the RCU (step 121) and moves to step 122 to send a ringing signal to the cordless station. The presence of an off-hook signal from the station is then checked (step 123). If the answer is affirmative, control returns an off-hook signal to the RCU (step 124), and if negative, control proceeds to step 125 to check to see if a ring trip signal is received from the RCU. If it is, control proceeds to step 126 to send a ring trip signal to the cordless station, and goes to step 127 to switch the access unit to the control channel. Following the execution of step 127, control returns to step 111. If negative decision is made in each of steps 118, 119 and 121, control exits to step 127, and if negative decision is made in step 125, control returns to step 123.

In FIG. 5C, the program execution of each cordless station starts with decision step 141 which determines if the station has received an individual alert signal or a group alert signal. If the received signal is an individual alert signal, control exits to step 142 to return an alert response signal to the access unit, and control proceeds to step 146.

If the receive signal is a group alert signal, step 143 is executed by storing one of the pairing identifiers contained in the received group alert signal which specifies the own cordless station, and control executes step 144 by introducing a delay period to wait for the transmission of all group standby signals from the RCU to the access units. Exit then is to step 145 to retrieve the stored pairing identifier and return a group alert response signal containing the retrieved pairing identifier to be received by the access unit which has received the same pairing identifier from the RCU. The timeout period specified in step 144 of each cordless station differs from the timeout period each of the other cordless stations so that group alert response signals are transmitted successively from different cordless stations. Control then proceeds to step 146 to check for the presence of a speech channel identifier from the access unit indicated by the pairing identifier. If this speech identifier is not received by the station within a specified period, control returns to step 141. If it is, control exits to step 147 to switch the station transceiver to a speech channel specified by the channel identifier, and an end-of-switching signal is then sent to the access unit (step 148). Interference check is made on the speech channel (step 149). If no interference is detected, control proceeds to step 148 to send an interference check signal to the access unit. Control proceeds to step 151 to check for the presence of a ringing signal from the access unit. If there is one, the ringer is activated (step 152), and control moves ahead to step 153 to check for an off-hook condition. If the user answers the call, control exits to step 153 to send an off-hook signal to the access unit. If the off-hook state is not detected within a specified timeout period, control goes to step 154 to check to see if a ring trip signal is received from the access unit. If it is, the ringer is deactivated (step 156) and control moves to step 157. If interference is detected in step 149, step 157 is executed.

The overall operation of the second embodiment during the individual station call mode is identical to that of the first embodiment.

The overall operation of the second embodiment during the group call mode will be described below with reference to FIG. 6.

When a group alert signal is received from the PBX, a radio control unit sends a copy 401 of it to access unit #1, which returns an acknowledgment signal 403 to the RCU and sends a group alert signal 402 to all cordless stations, containing in it a first pairing identifier indicating the formation of a first pair with access unit #2 and cordless station #1 and a second pairing identifier indicating the formation of a second pair with access unit #3 and cordless station #2. The RCU then successively transmits a group standby signal 404 containing the first pairing identifier to access unit #2 and a group standby signal 405 containing the second pairing identifier to access unit #3. Acknowledgment signals 406 and 407 are returned to the RCU from access units #2 and #3, respectively. At the end of the timeout period (step 144, FIG. 5C), cordless station #1 sends a group alert response signal 408 containing the first pairing identifier. This signal is received by access unit #2 since the pairing identifier contained in it matches the pairing identifier contained in the group standby signal 404 (step 133, FIG. 5B). Access unit #2 returns a copy 409 of group alert response signal 408 and sends a speech channel identifier 410 to cordless station #1 of the same pair. The latter switches its transceiver to a speech channel specified by the channel identifier, sends an end-of-switching signal 411 to access unit #2, provides an interference check and sends an interference check signal 412 to access unit #2. Access unit #2 then returns an end-of-connection signal 413 to the RCU.

The reception of group alert response 409 by the RCU marks the beginning of a sequence 1 and the reception of end-of-connection signal 413 marks the end of sequence 1. Sequence 2 similar to sequence 1 begins with the reception of a group alert response signal 415 by the RCU from access unit #3 in which there is a match between the pairing identifier received from station #2 and the one contained in group standby signal 405. An end-of-switching signal 417 and an interference check signal 418 are successively sent from station #3 to access unit #3 of the same pair, which returns an end-of-connection signal 419 to the RCU at the end of sequence 2.

Ringing signals 420 and 421 are successively transmitted from the RCU to access units #2 and #3, respectively, resulting in the transmission of copies 422 and 423 of ringing signals 420, 421, to cordless stations #1 and #2, respectively. If station #1 goes off hook, it sends an off-hook signal 424 to access unit #2, which returns a copy 425 of this off-hook signal to the RCU. In response to the off-hook signal 425, the RCU sends a ring trip signal 426 to access unit #3, which sends a copy 427 of ring trip signal 426 to cordless station #3.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A wide area cordless telephone system for covering a plurality of service areas in each of which a plurality of cordless stations are located, comprising:

control means connected to a telephone network for generating a group-call signal in response to an incoming call from the telephone network; and a plurality of access units divided into groups corresponding respectively to a respective service area, the access units of each group for establishing a radio control channel with the cordless stations located in the same service area as said access units, said access units of each group being responsive to said group-call signal for transmitting speech-channel identifiers to said cordless stations through said control channel to establish radio speech channels with the cordless stations located in the same service area as said access units receiving said group call signal, and transmitting ringing signals respectively to said cordless stations through said speech channels.

2. A wide area cordless telephone system as claimed in claim 1, wherein each of said cordless stations transmits an off-hook signal through the respective speech channel to said control means via one of said access units if an off hook condition occurs following reception of said ringing signals, said control means transmitting ring trip signals through said access unit to the cordless stations other than the cordless station which transmitted said off-hook signal for causing the non-answering cordless stations to stop producing ringing signals.

3. A wide area cordless telephone system for covering a plurality of service areas in each of which a plurality of cordless stations are located, comprising:

control means connected to a telephone network for generating an alert signal containing a plurality of pairing identifiers in response to an incoming call from the telephone network, and successively generating standby signals each containing a different one of said pairing identifiers; and a plurality of access units divided into groups corresponding respectively to said service areas, the access units of each group being located in a corresponding service area for establishing a radio control channel with cordless stations located in the same service area as said access units of the group, a specified one of said access units of each group being responsive to a received alert signal for transmitting a copy of said received alert signal to each of said cordless stations in its service area through said control channel and causing said cordless stations to successively return respective ones of aid pairing identifiers through said control channel, said access units of said group respectively receiving said standby signals for respectively storing a pairing identifier contained in the received standby signals, each of said access units of each group being responsive to one of the pairing identifiers from said cordless stations for transmitting a speech-channel identifier to the cordless station specified by the stored pairing identifier through said control channel to establish a radio speech channel with the specified cordless station instead of the control channel if said one of the pairing identifiers from said cordless stations is identical to the pairing identifier to which said access unit is responsive and transmitting a ringing signal to said specified cordless station through said speech channel.

4. A wide area cordless telephone system as claimed in claim 3, wherein each of said cordless stations transmits an off-hook signal through the respective speech channel to said control means via one of said access units if an off hook condition occurs following reception of said ringing signal, said control means transmitting ring trip signals through said access units to the cordless stations other than the cordless station which transmitted said off-hook signal for causing the non-answering cordless stations to stop the ringing signals.

5. A wide area cordless telephone system for covering a plurality of service areas in each of which a plurality of cordless stations are located, comprising:

control means connected to a telephone network for generating an individual-call signal when an incoming call from said network is an individual call directed to one of the cordless stations and generating a group-call signal when said incoming call is a group call directed to all cordless stations located in a same service area; and a plurality of access units divided into groups corresponding respectively to a respective service area, the access units of each group for establishing a radio control channel with the cordless stations located in the same service area as said access units, said access units of each group being responsive to said individual-call signal for transmitting a speech-channel identifier to one of the cordless stations through said control channel to establish a radio speech channel with said one of the cordless stations instead of the control channel and transmitting a ringing signal through said speech channel, said access units of each group being further responsive to said group-call signal for transmitting said speech-channel identifiers to said cordless stations through said control channel to establish radio speech channels with said cordless stations receiving said group call signal and transmitting group ringing signals respectively to said cordless stations through said speech channels.

6. A wide area cordless telephone system as claimed in claim 5, wherein each of said cordless stations transmits an off-hook signal through the respective speech channel to said control means via one of said access units if an off hook condition occurs following reception of said group ringing signals, said control means transmitting ring trip signals through said access units to the cordless stations other than the cordless station which transmitted said off-hook signal for causing the non-answering cordless stations to stop producing the ringing signals.

7. A wide area cordless telephone system for covering a plurality of service areas in each of which a plurality of cordless stations are located, comprising:

control means connected to a telephone network for generating an individual-call signal when an incoming call from said network is an individual call directed to one of the cordless stations and generating a group alert signal containing a plurality of pairing identifiers when said incoming call is a group call directed to all cordless stations located in a same service area, and successively generating group standby signals each containing a different one of said pairing identifiers; and a plurality of access units divided into groups corresponding respectively to said service areas, the access units of each group being located in a corresponding service area for establishing a radio control channel with cordless stations located in the same service area as said access units of each group, said access units of each group being responsive to said individual-call signal for transmitting a speech-channel identifier to one of the cordless stations through said control channel to establish a radio speech channel with said one cordless station instead of the control channel and transmitting a ringing signal through said speech channel to said one cordless station, a specified one of said access units of each group being responsive to a received group alert signal for transmitting a copy of said received group alert signal to each of said cordless stations in its service area through said control channel and causing said cordless stations to successively return respective ones of said pairing identifiers through said control channel, and said access units of each group being respectively responsive to said group standby signals for respectively storing a pairing identifier contained in a respective one of said group standby signals, each of said access units of the group being responsive to one of the pairing identifiers from said cordless stations for transmitting a speech-channel identifier to the cordless station specified by the stored pairing identifier through said control channel to establish a radio speech channel with the specified cordless station if said one of the pairing identifiers from said cordless stations is identical to the pairing identifier to which said access unit is responsive and transmitting a group ringing signal to said specified cordless station through said speech channel.

8. A wide area cordless telephone system as claimed in claim 7, wherein each of said cordless stations transmits an off-hook signal through the respective speech channel to said control means via one of said access units if an off hook condition occurs following reception of said group ringing signal, said control means transmitting ring trip signals through said access units to the cordless stations other than the cordless station which transmitted said off-hook signal for causing the non-answering cordless stations to stop producing the ringing signals.

* * * * *